A. Eames,
Polishing Stone.

Nº 8,150.             Patented June 10, 1851.

UNITED STATES PATENT OFFICE.

ALBERT EAMES, OF SPRINGFIELD, MASSACHUSETTS.

MACHINE FOR FACING AND POLISHING STONE AND OTHER SUBSTANCES.

Specification of Letters Patent No. 8,150, dated June 10, 1851.

*To all whom it may concern:*

Be it known that I, ALBERT EAMES, of Springfield, in the county of Hampden and State of Massachusetts, have invented certain new and useful Improvements in Machinery for Facing or Polishing Stones and other Substances, and that the following is a full, clear, and exact description of the same, reference being had to the accompanying drawings, making part of this specification, in which—

Figure 1:
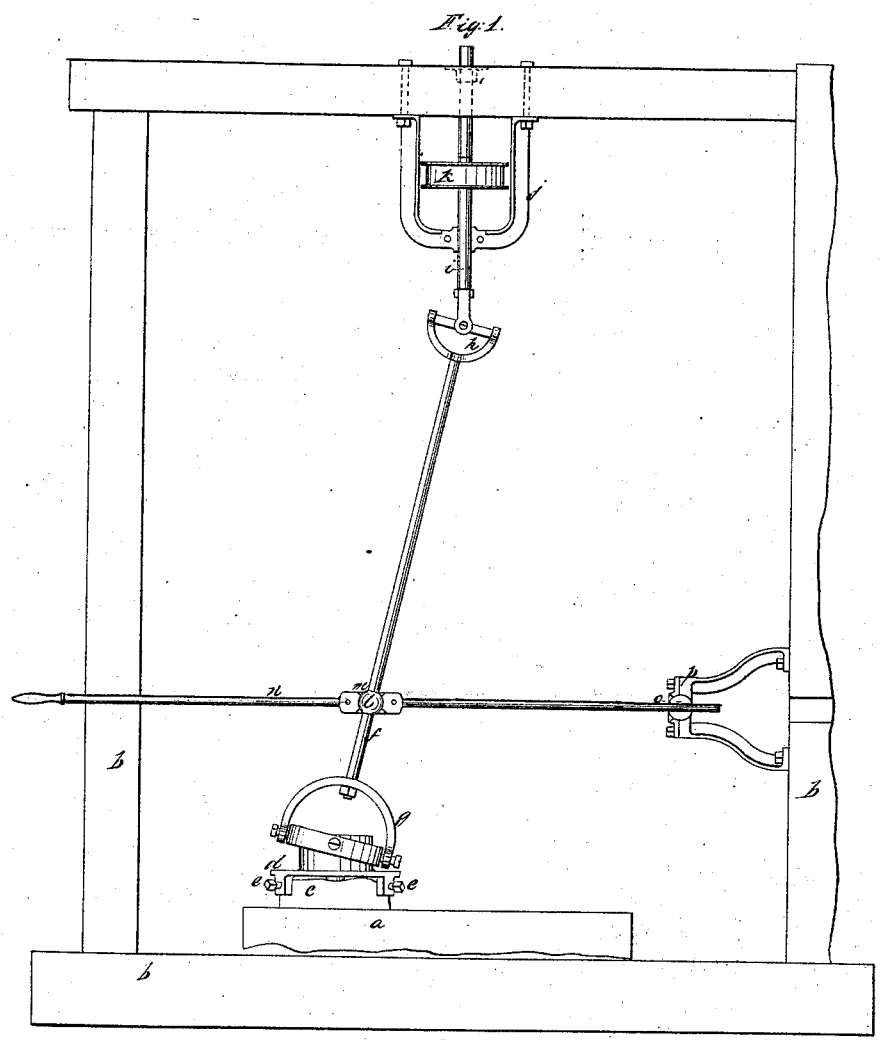
Figure 2:
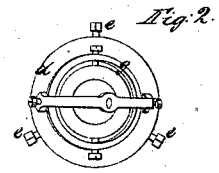

Figure 1 is an elevation of the machine with certain parts in section and Fig. 2 a plan of the chuck with its universal joint.

The same letters indicate like parts in all the figures.

The object of my invention is to face, rub down or polish the surface of stones and other substances after they have been dressed, and the nature of my invention consists in effecting this purpose by means of a rubber, grinder or polisher attached to a chuck and connected and combined by means of universal joints with a spindle driving motion from some first mover to rotate the said grinder, rubber or polisher which is made self adapting to the surface to be worked by the sliding of the spindle in its bearings, or the equivalent thereof, the grinder, rubber or polisher being moved over the surface to be faced or polished by means of a hand lever connected with the connecting rod of the universal joints and with the frame by ball and socket joints that it may be free to move in all directions.

In the accompanying drawings $a$ represents the stone to be faced, rubbed or polished, the said stone being placed on any appropriate platform or base of the frame $b$.

A block of stone $c$ such as is used for rubbing down, facing or polishing stone is secured to the under face of a metal chuck $d$ by securing screws $e$. The said chuck is connected with the lower end of a connecting rod $f$ by means of a universal joint $g$ of the usual construction, and the upper end of the said rod is in turn connected by means of another universal joint $h$ with the lower end of a spindle $i$ which is adapted to slide vertically in appropriate boxes in a frame $j$; the said spindle being provided with a pulley $k$ to receive a band from some first mover.

The connecting rod $f$ is provided with a ball $l$ embraced by a socket $m$, on a hand lever $n$ the rear end of which is free to slide in a hole in another ball $o$ fitted to a socket in a frame $p$.

From the foregoing it will be seen that as the spindle is rotated it will communicate a rotary motion to the grinder, rubber or polisher $c$ to grind, rub or polish the surface of the stone $a$, and that the attendant by means of a hand lever can cause it to traverse over the entire surface of the stone, while the connections of the chuck with the spindle $i$ and the sliding of the spindle in its boxes render it self adapting to the surface to be worked. By this means a small grinder can be carried over every part successively of a very large surface, bearing with equal force on every point, and as the grinding, rubbing or polishing is effected by its rotary motion, the attendant can continue the operation on every part of the surface as long as may be desired, this being often important by reason of the varying texture of the material.

It will be obvious that any kind of substance which will answer the purpose of grinding, facing or polishing can be employed, and that emery and other pulverized substances can be employed to assist the grinder or polisher.

Although I have represented one kind of universal joints to form the connections between the chuck and spindle and between the connecting rod and hand lever, I do not mean to limit myself to this special construction as other kinds of universal joints may be substituted therefor—nor do I wish to limit myself to the mode of rendering the grinder or polisher self adapting to the surface operated on, by the sliding of the spindle, as the same thing can be effected by known mechanical equivalents, such as a sliding feathered joint in the connecting rod. But I have described and represented the mode of construction which I have essayed with success and deem the best.

What I claim as my invention and desire to secure by Letters Patent, is—

The method substantially as herein described of grinding, facing or polishing the surface of stones and other substances, by means of a grinder, rubber or polisher, connected and combined with a spindle from which it derives a rotary motion by means of universal and sliding joints, substantially as described, that the said grinder, rubber or polisher may be carried over any and all parts of the surface to be worked while its surface is self adapting, as described.

ALBERT EAMES.

Witnesses:
 PHILOS B. TYLER,
 S. R. B. LEWIS.